(12) United States Patent
Branton et al.

(10) Patent No.: US 11,826,904 B2
(45) Date of Patent: Nov. 28, 2023

(54) END EFFECTOR, SYSTEM AND METHOD FOR PICKING UP AND PLACING AN OBJECT

(71) Applicant: The Boeing Company, Chicago, IL (US)

(72) Inventors: Jennifer F. Branton, Summerville, SC (US); Daniel Johnson, Charleston, SC (US); Luis F. Velasquez, Ladson, SC (US); Caleb J. Handolescu, Ladson, SC (US); Charlie E. Branyon, III, Summerville, SC (US)

(73) Assignee: The Boeing Company, Arlington, VA (US)

( * ) Notice: Subject to any disclaimer, the term of this patent is extended or adjusted under 35 U.S.C. 154(b) by 63 days.

(21) Appl. No.: 17/463,335

(22) Filed: Aug. 31, 2021

(65) Prior Publication Data
US 2022/0161446 A1 May 26, 2022

Related U.S. Application Data

(60) Provisional application No. 63/118,312, filed on Nov. 25, 2020.

(51) Int. Cl.
*B25J 15/06* (2006.01)
(52) U.S. Cl.
CPC ................. *B25J 15/0691* (2013.01)
(58) Field of Classification Search
CPC . B25J 15/0683; B25J 15/0691; B66C 1/0231; B66C 1/0237; B66C 1/0281; B29C 70/544

USPC ........................................................ 294/189
See application file for complete search history.

(56) References Cited

U.S. PATENT DOCUMENTS

| | | | | | |
|---|---|---|---|---|---|
| 3,404,787 | A | * | 10/1968 | Hayford | B66C 1/025 414/796 |
| 3,580,221 | A | * | 5/1971 | Noyes | A01K 15/00 119/728 |
| 3,640,562 | A | * | 2/1972 | Creskoff | B66C 1/0281 248/363 |
| 3,833,251 | A | * | 9/1974 | Creskoff | B66F 9/181 294/65 |
| 4,639,030 | A | * | 1/1987 | Bini | B65B 35/38 294/186 |
| 5,088,878 | A | * | 2/1992 | Focke | B65G 47/91 414/793 |
| 5,240,299 | A | * | 8/1993 | Flavell | B25J 15/0019 294/902 |
| 8,960,749 | B2 | * | 2/2015 | Fukano | H01L 21/6838 294/188 |
| 10,052,827 | B2 | * | 8/2018 | Rotter | B29C 73/12 |
| 2018/0339413 | A1 | | 11/2018 | Halbritter et al. | |

(Continued)

*Primary Examiner* — Dean J Kramer
(74) *Attorney, Agent, or Firm* — Kunzler Bean & Adamson

(57) ABSTRACT

Described herein is an end effector for picking up and placing an object on a rigid tool. The end effector comprises a plate and an internal seal attached to the plate. The internal seal comprises an internal permeable layer and an internal impermeable film. The end effector further comprises at least one vacuum port extending through the plate and open to the internal permeable layer. Additionally, the end effector may comprise an external seal attached to the plate. The external seal comprises an external permeable layer and an external impermeable film.

20 Claims, 11 Drawing Sheets

(56) References Cited

U.S. PATENT DOCUMENTS

2020/0048015 A1\* 2/2020 Martin .................. B65G 47/91
2021/0107169 A1 4/2021 Velasquez et al.

\* cited by examiner

END EFFECTOR, SYSTEM AND METHOD FOR PICKING UP AND PLACING AN OBJECT

FIELD

This disclosure relates generally to the manufacture and assembly of large-scale parts, and more particularly to an end effector for picking up and placing objects onto rigid tools.

BACKGROUND

Some large-scale composite parts, or parts made from a fiber-reinforced polymeric material, are manufactured using a ply-by-ply lay-up process. This process may be facilitated by manually-operated tools and/or by automated equipment, such as an automated fiber placement machine or a contour tape layer machine.

Often, the plies of the composite part are laid up, ply-by-ply, on a critical path cure tool prior to curing the composite part. Such a lay-up process occupies the critical path cure tool while the plies are laid up, which prevents the critical path cure tool from being used for curing other composite parts.

In alternative processes, a supporting lamination mandrel or feeder line may be used to lay up the un-cured composite part, which is then picked up by equipment, transferred, and placed on the critical path cure tool for curing. According to this process, the critical path cure tool can be used to cure other parts while the un-cured composite part is laid up. However, so-called pick-and-place equipment that use discrete end effectors for large-scale composite parts can damage the composite parts, such as by creating indentations, distortions, or deformations in the un-cured composite part. Furthermore, large-scale un-cured composite parts are only supported at discrete locations, corresponding with the discrete end effectors, which can cause sagging in the un-cured composite part, thus making difficult stable transportation that does not damage the part.

SUMMARY

The subject matter of the present application has been developed in response to the present state of the art, and in particular, in response to shortcomings of conventional pick and place processes and systems. Accordingly, the subject matter of the present application provides an end effector and system with an external seal, and associated methods, that overcome at least some of the above-discussed shortcomings of conventional processes and systems.

Described herein is an end effector that comprises a plate comprising a first side and a second side. The second side is opposite the first side and is configured to interface with an object. The end effector also comprises an internal seal attached to the second side of the plate. The internal seal comprises an internal permeable layer and an internal impermeable film. The internal impermeable film extends about and beyond an entire periphery of the internal permeable layer such that the entire periphery of the internal permeable layer is interposed between the second side of the plate and the internal impermeable film. The end effector additionally comprises at least one vacuum port extending through the plate and open to the internal permeable layer. The preceding subject matter of this paragraph characterizes example 1 of the present disclosure.

The end effector further comprises an external seal attached to the first side of the plate. The external seal comprises an external permeable layer extending from the first side of the plate beyond an outer periphery of the plate. The external seal also comprises an external impermeable film covering the external permeable layer such that the external permeable layer is interposed between the first side of the plate and the external impermeable film. The external impermeable film extends beyond an entire periphery of the external permeable layer and extends from the first side of the plate beyond the outer periphery of the plate. The preceding subject matter of this paragraph characterizes example 2 of the present disclosure, wherein example 2 also includes the subject matter according to example 1, above.

The internal permeable layer and the external permeable layer each comprises an open-celled material. The preceding subject matter of this paragraph characterizes example 3 of the present disclosure, wherein example 3 also includes the subject matter according to example 2, above.

The open-celled material comprises a bi-planar mesh. The preceding subject matter of this paragraph characterizes example 4 of the present disclosure, wherein example 4 also includes the subject matter according to example 3, above.

The internal seal is noncontiguous with the second side of the plate. The preceding subject matter of this paragraph characterizes example 5 of the present disclosure, wherein example 5 also includes the subject matter according to any one of examples 1-4, above.

The at least one vacuum port comprises slots arranged in a grid pattern. The preceding subject matter of this paragraph characterizes example 6 of the present disclosure, wherein example 6 also includes the subject matter according to any one of examples 1-5, above.

The plate is rigid. The preceding subject matter of this paragraph characterizes example 7 of the present disclosure, wherein example 7 also includes the subject matter according to any one of examples 1-6, above.

Alternately, the plate is flexible. The preceding subject matter of this paragraph characterizes example 8 of the present disclosure, wherein example 8 also includes the subject matter according to any one of examples 1-6, above.

Further described herein is a system for picking up and placing an object. The system comprises an end effector that comprises a plate comprising a first side and a second side. The second side is opposite the first side and is configured to interface with an object. The end effector also comprises an internal permeable layer attached to the second side of the plate. The end effector further comprises an external seal attached to the first side of the plate. The external seal comprises an external permeable layer that extends from the first side of the plate beyond an outer periphery of the plate. The external seal also comprises an external impermeable film covering the external permeable layer such that the external permeable layer is interposed between the first side of the plate and the external impermeable film. The external impermeable film extends beyond an entire periphery of the external permeable layer and extends from the first side of plate beyond the outer periphery of the plate. Additionally, the end effector comprises at least one vacuum port extending through the plate and open to the internal permeable layer. A vacuum is connected to the vacuum port and configured to apply negative pressure to the end effector. The preceding subject matter of this paragraph characterizes example 9 of the present disclosure.

The internal permeable layer has a surface area equal to a surface area of the second side of the plate. The preceding subject matter of this paragraph characterizes example 10 of the present disclosure, wherein example 10 also includes the subject matter according to example 9, above.

Alternatively, the internal permeable layer has a surface area greater than a surface area of the second side of the plate. The preceding subject matter of this paragraph characterizes example 11 of the present disclosure, wherein example 11 also includes the subject matter according to example 9, above.

The system further comprises an internal impermeable film about and extending beyond an entire periphery of the internal permeable layer such that the entire periphery of the internal permeable layer is interposed between the second side of the plate and the internal impermeable film. The preceding subject matter of this paragraph characterizes example 12 of the present disclosure, wherein example 12 also includes the subject matter according to example 11, above.

Further described herein is a method for picking up and placing an object. The method comprises placing at least one end effector over an object. The end effector comprises an external seal that extends beyond an outer periphery of the end effector. The external seal comprises an external permeable layer and an external impermeable film that covers the external permeable layer and extends beyond an entire periphery of the external permeable layer. The method also comprises connecting a high-flow vacuum to a vacuum port in the end effector. The method further comprises applying a negative pressure via the high-flow vacuum to seal the object to the end effector at the external seal. The method additionally comprises transporting the object while the negative pressure is retained. The preceding subject matter of this paragraph characterizes example 13 of the present disclosure.

The method further comprises locating the object on a rigid tool and halting the negative pressure when the object is on the rigid tool. Additionally, the method comprises removing the end effector from the object. The preceding subject matter of this paragraph characterizes example 14 of the present disclosure, wherein example 14 also includes the subject matter according to example 13, above.

Placing the at least one end effector over the object further comprises placing at least one end effector comprising an internal seal over the object. The internal seal interfaces with the object and comprises an internal permeable layer and an internal impermeable film about and extending beyond an entire periphery of the internal permeable layer. Applying the negative pressure further comprises applying a negative pressure to seal the object to at least one end effector at the internal seal and the external seal. The preceding subject matter of this paragraph characterizes example 15 of the present disclosure, wherein example 15 also includes the subject matter according to any one of examples 13-14, above.

Placing at least one end effector over the object comprises placing multiple end effectors over the object. Additionally, connecting the high-flow vacuum comprises connecting the high-flow vacuum to a vacuum port in each end effector of the multiple end effectors. Furthermore, applying the negative pressure via the high-flow vacuum comprises synchronously applying the negative pressure via the high-flow vacuum to seal the object to the multiple end effectors at the external seal in each end effector. Also, transporting the object comprises transporting the object by synchronously operating the multiple end effectors to transport the object. The preceding subject matter of this paragraph characterizes example 16 of the present disclosure, wherein example 16 also includes the subject matter according to any one of examples 13-15, above.

The method further comprising shaping the object when the object is held under the negative pressure by the end effector by altering a shape of the end effector. The preceding subject matter of this paragraph characterizes example 17 of the present disclosure, wherein example 17 also includes the subject matter according to any one of examples 13-16, above.

The method further comprising locating the object on a rigid tool and shaping the object between the rigid tool and the end effector, while the object is held under negative pressure by the end effector, by altering a shape of the end effector. The preceding subject matter of this paragraph characterizes example 18 of the present disclosure, wherein example 18 also includes the subject matter according to any one of examples 13-17, above.

The object comprises an uncured fiber reinforced laminate and placing the at least one end effector over the object comprises placing the at least one end effector over the uncured fiber reinforced laminate. The preceding subject matter of this paragraph characterizes example 19 of the present disclosure, wherein example 19 also includes the subject matter according to any one of examples 13-18, above.

The object comprises a permeable object and an impermeable material underneath the entirety of the permeable object and extending beyond the periphery of the permeable object, and placing the at least one end effector over the object comprises placing the at least one end effector over the permeable object and the impermeable material such that the permeable object is entirely interposed between the end effector and the impermeable material. The preceding subject matter of this paragraph characterizes example 20 of the present disclosure, wherein example 20 also includes the subject matter according to any one of examples 13-18, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Figure 1:
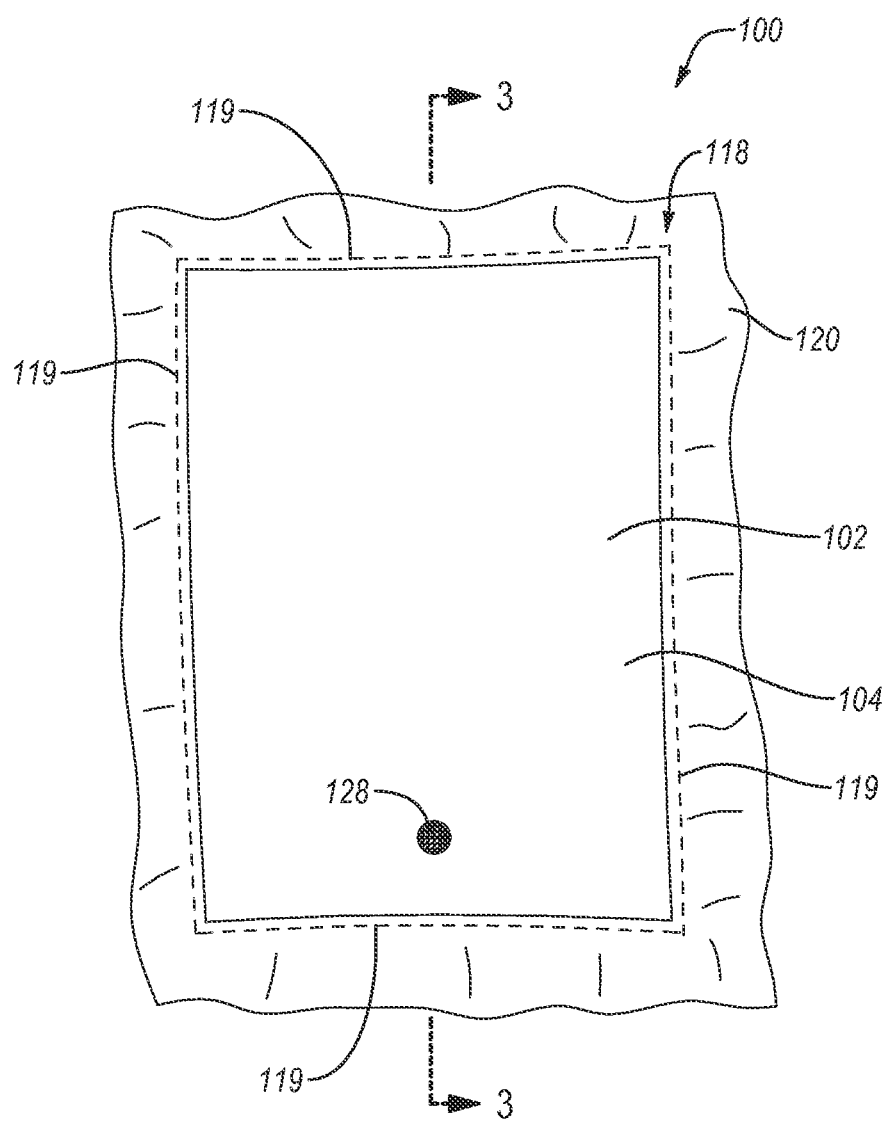
FIG. 1 is a schematic top view of an end effector for picking up an object, according to one or more examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

In some examples, the present disclosure provides an end effector that is configured to pick up a large-scale pliable object. The object could be any non-rigid object that is pliable and would benefit from being transported from a supporting surface to a different location without distortion or damage to the object. The object includes, but is not limited to, an un-cured composite part. The object may be a high-performance material, such as composites that are used in the aerospace or automotive industries. An un-cured composite part is pliable and may be laid-up in multiple layers (e.g., to form a laminate sheet) on a supporting surface. The un-cured composite part is infused with a viscous resin that solidifies when the composite part is cured to harden the resulting composite part. However, before the un-cured composite part is cured, the un-cured composite part may be incapable of supporting itself after it is laid-up onto the supporting surface before being moved to a critical path cure tool for curing. Therefore, the un-cured composite part needs support during transportation from the supporting surface to a different location, such as the critical path cure tool.

Generally, the process of picking up the object includes applying negative pressure to at least one end effector via a vacuum to form a suction hold that secures the object to the end effector. The end effector of the present invention can be used to generate a suction hold that is evenly applied over an entire designated area rather than at only discrete locations within the designated area, which can damage the object by creating indentations, distortions, or deformations in the object. Additionally, objects that are only supported at discrete locations, corresponding with discrete end effectors, can cause sagging in the object during transportation making it difficult to provide stable transportation that does not cause damage to the object. Damage caused to the object during transportation can impact the structure and performance of the object after transportation. For example, an un-cured composite part that is unsupported during transportation can impact the performance of the final cured composite part. Accordingly, the end effector helps to ensure the object is evenly supported during transportation without indenting, distorting, or otherwise deforming the object. In other words, the structure of the object is maintained during transportation to minimize the creation of distortion in the object which would impact performance of the object after transportation.

Figure 2:
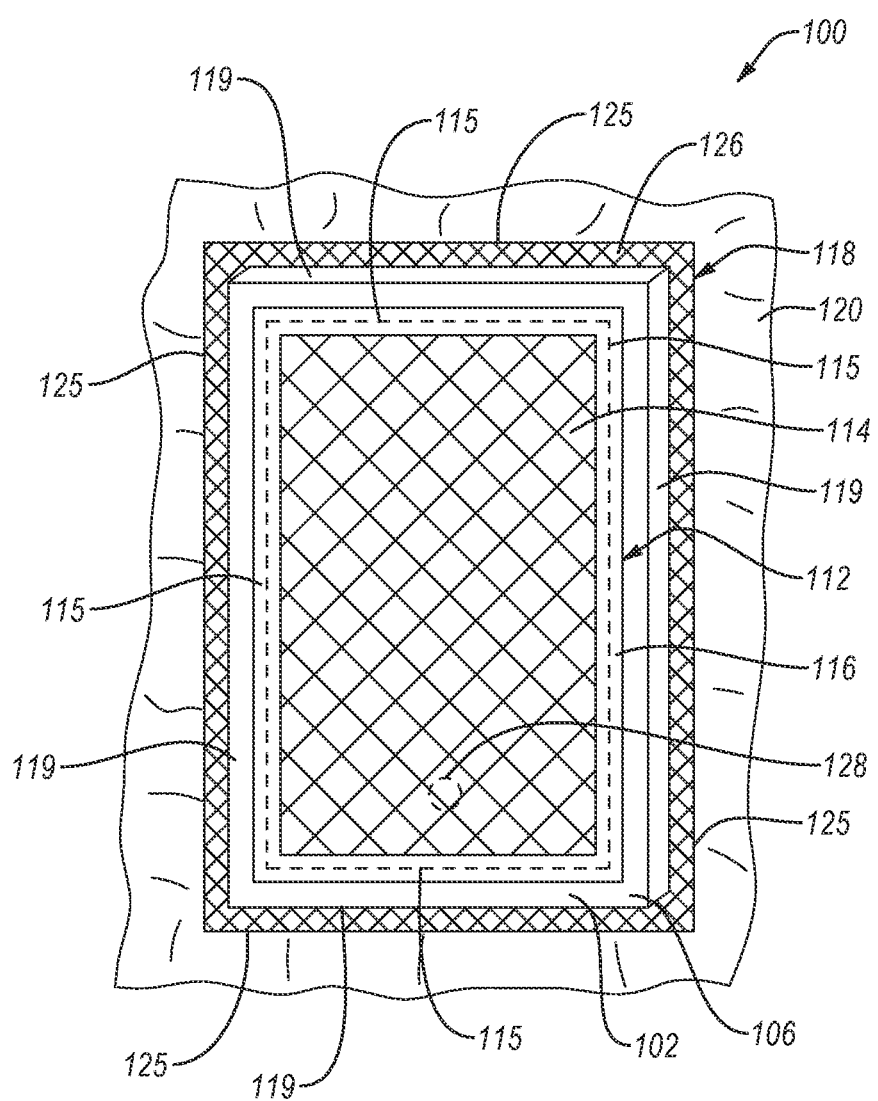
FIG. 2 is a schematic bottom view of an end effector for picking up an object, according to one or more examples of the present disclosure.
Figure 3:
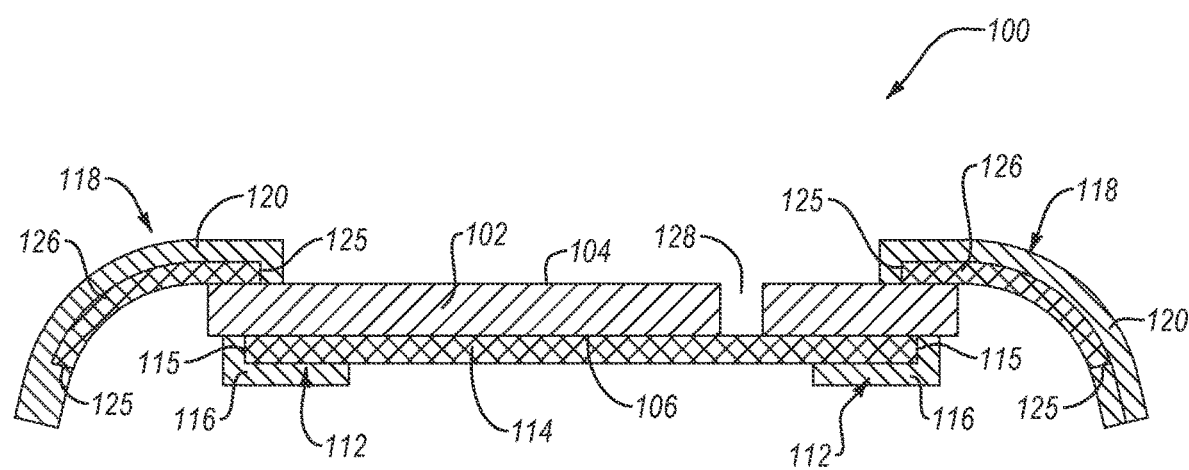
FIG. 3 is a schematic cross-sectional side elevation view of the end effector of FIG. 1, taken along line 3-3 of FIG. 1, according to one or more examples of the present disclosure.

Referring to FIGS. 1-3, and according to some examples, an end effector 100 for picking up an object 110 (see, e.g., FIG. 6) is shown. The end effector 100 includes a plate 102 that supports the object 110 while the end effector 100 picks up and transports the object 110. The plate 102 has a first side 104 and a second side 106 (see, e.g., FIG. 2). The second side 106 is opposite of the first side 104 and configured to interface with the object 110. As used herein, interface means that two or more surfaces are brought together in close proximity, including direct contact or indirect contact, and positionally maintained by a negative pressure (e.g. suction). Accordingly, the second side 106 of the plate 102 and a surface of the object 110 are brought in close proximity when the end effector 100 is in use and applying the necessary negative pressure. Therefore, the second side 106 of the plate 102 is configured to interface with the object 110. In certain examples, the second side 106 of the plate 102 has a flat or planar surface. In other examples, the second side 106 of the plate 102 includes one or more contours. As shown in FIG. 1, the plate 102 has four edges 119 and is rectangular in shape. However, the plate 102 can have any of various shapes or dimensions and may or may not correlate with the shape and size of the object 110.

In one example, the plate 102 is rigid, which, as used herein, can mean the plate 102 is more rigid than the object 110. In some implementations, the plate 102 is made of metal, hardened plastics, fiber-reinforced plastics, ceramic material and/or the like, and is sufficiently rigid to withstand, without deformation, a negative pressure differential. Accordingly, the plate 102 will remain rigid when the end effector 100 is under negative pressure. In other examples, the plate 102 is flexible, which, as used herein, can mean the plate 102 is capable of altering its shape and maintaining the new shape, without deformation, at a negative pressure differential. In some implementations, the plate 102 is made of a flexible material such as sheet metal, plastic, composite, rubber and/or the like. A plate 102, which is flexible, can be utilized to pick up an object 110 and adjust the shape of the object 110, such as a two-dimensional object into a three-dimensional object. Generally, the curvature of the second side 106 of the plate 102 will correspond with the curvature of the object 110 before it is picked up. Accordingly, the curvature of the second side 106 of the plate 102 (which may be planar or non-planar) and the object 110 will complement each other when the object 110 is picked up by the end effector 100 and will continue to complement each other as the object 110 is held under negative pressure even if the shape of the plate 102 is altered. In other words, the curvature of the second side 106 of the plate 102 and the object 110 complement each other to ensure that the object 110 is evenly supported during transportation, even if the shape of the plate 102, and therefore the object 110, is altered.

The end effector 100 includes an internal seal 112 attached to the second side 106 of the plate 102. In one example, the plate 102 has multiple edges 119 and the internal seal 112 is attached to the second side 106 of the plate such that the internal seal 112 is contiguous or noncontiguous with each edge 119 of the plate 102. Since the internal seal 112 is a continuous seal (i.e., no gaps or through-opening in the seal), the internal seal 112 extends continuously from each edge 119 of the plate 102 to adjacent edges when the internal seal 112 is contiguous with the edges 119 of the plate 102. Although the internal seal 112 can be made up of multiple pieces of material connected together, because there are no gaps between the multiple pieces, the internal seal 112 is considered continuous. Accordingly, regardless of the shape of the plate 102, the internal seal 112 is attached on the second side 106 of the plate 102 and is utilized to create a continuous seal on the second side 106 of the plate 102.

The internal seal 112 includes an internal permeable layer 114. In one example, the internal permeable layer 114 has a surface area less than a surface area of the second side 106 of the plate 102. Accordingly, the internal permeable layer 114 is noncontiguous with an entirety of the second side 106 of the plate 102 in some examples. The internal permeable layer 114 is made of a low-stick material that helps reduce (e.g., eliminate) surface-to-surface adhesion between the object 110 and the internal permeable layer 114 before and after the negative pressure has been applied by the vacuum 130, as described in more detail below. Additionally, the internal permeable layer 114 is air permeable to allow gas (e.g. air) to be drawn, via a vacuum port 128, evenly through the internal permeable layer 114, rather than being localized at the vacuum port 128. The internal permeable layer 114 may be both laterally (e.g., across a length or width) and vertically (e.g., across a thickness) air permeable or may have air flow through the internal permeable layer 114 that is irregular or non-linear (e.g., foam). In certain examples, the internal permeable layer 114 is affixed to the second side 106 of the plate 102 by an adhesive (e.g., sealant, glue, etc.), or other attachment means (e.g., fasteners), at discrete locations such that the attachment locations have only a negligible effect on the airflow through the internal permeable layer 114. In one example, however, the internal permeable layer 114 is not affixed to the second side 106 of the plate 102 via sealant, glue, fasteners, etc. In such an example, the internal permeable layer 114 is held in place by an internal impermeable film 116 of the internal seal 112.

The internal seal 112 also includes an internal impermeable film 116 attached to the second side 106 of the plate 102 and overlapping a portion of the internal permeable layer 114. The internal impermeable film 116 extends about an entire peripheral portion 115 of the internal permeable layer 114 such that the entire peripheral portion 115 of the internal permeable layer 114, which includes the entire outer periphery of the internal permeable layer 114, is interposed between the second side 106 of the plate 102 and a portion of the internal impermeable film 116. In one example, the area of the internal impermeable film 116 that overlaps the peripheral portion 115 of the internal permeable layer 114 is more than the area of the internal impermeable film 116 that does not overlap the internal permeable layer 114 and that is attached directly to the second side 106. In another example, the area of the internal impermeable film 116 overlapping the internal permeable layer 114 is less than the area of the internal impermeable film 116 that does not overlap the internal permeable layer 114 and that is attached directly to the second side 106.

In some examples, the internal impermeable film 116 overlaps the internal permeable layer 114 between 1 to 4 inches. In this manner, the internal impermeable film 116 is in direct contact with a portion of the internal permeable layer 114 and in direct contract with the portion of the plate 102 around the entire peripheral portion 115 of the internal permeable layer 114. According to one example, the internal impermeable film 116 may by adhered to the second side 106 of the plate 102 via a sealing mechanism, such as an adhesive or tape affixed to the second side 106 and to which the internal impermeable film 116 is affixed. In another example, the internal impermeable film 116 is self-sealing, such as a tape, and is directly affixed to the second side 106 of the plate 102. Furthermore, the internal impermeable film 116 may also be adhered to the peripheral portion 115 of the internal permeable layer 114 via an adhesive, tape, or other adhesive means.

In other examples, when the end effector 100 is in use, the vacuum 130 can generate a pressure differential that self-seals the internal impermeable film 116 to the entire peripheral portion 115 of the internal permeable layer 114. Accordingly, the internal permeable layer 114 can be held in place by the negative pressure applied at the end effector 100 and not be affixed to the plate 102 or the internal impermeable film 116. Therefore, the internal seal 112 may be used to hold the internal permeable layer 114 in place as well as seal the object 110 to the end effector 100. Any air leakage from the internal seal 112 could be contained by an external seal 118.

In one example, the internal impermeable film 116 is flexible and conforms to the shape of the object 110 when the end effector 100 secures the object 110. The internal impermeable film 116 has a permeability low enough to prevent gasses (e.g. air) from permeating through the internal impermeable film 116, whether in thickness or plane. Accordingly, the permeability of the internal impermeable film 116 is lower than the permeability of the internal permeable layer 114. In one example, the internal impermeable film 116 is made of a durable polymeric material, such as nylon, latex, or a thermoplastic elastomer, or a fabric.

In some examples, the end effector 100 includes an external seal 118 attached to the first side 104 of the plate 102 and extending continuously about the outer periphery of the plate 102 and extending outwardly from and beyond the outer periphery of the plate 102. In one example, the plate 102 has multiple edges 119 and the external seal 118 is attached on the first side 104 of the plate adjacent to each edge 119 of the plate 102. Since the external seal 118 is a continuous seal (i.e. no gaps or through-opening in the seal), the external seal 118 attached along each edge 119 of the plate is continuous with the external seal 118 attached at the neighboring edges 119. In this manner, the outer periphery of the plate 102 (i.e., the sum of the edges 119) is entirely surrounded by the external seal 118. Although the external seal 118 is continuous, the external seal 118 is not necessarily made from a single, seamless, piece of material. Instead, the external seal 118 may be made of multiple pieces of material connected together to form a continuous seal. In another example, the plate 102 has a circular shape and the external seal 118 is attached on the first side 104 of the plate 102 adjacent to the outer periphery and surrounds and extends beyond the entire circumference of the plate 102. Accordingly, regardless of the shape of the plate 102, the external seal 118 is attached on the first side 104 of the plate and is utilized to create a continuous seal around and beyond the entire outer periphery of the plate 102.

In other examples, the end effector 100 includes an external seal 118 attached to the first side 104 of the plate 102 but does not extend continuously about the outer periphery of the plate 102. The end effector 100 may have an external seal 118 attached to a portion of the first side 104 of the plate 102, such as one or two sides of the plate 102. This configuration may be useful when the object 110 to be moved has a surface area larger than the surface area of the plate 102 and the object 110 extends beyond a portion of the plate 102 but does not extend beyond an entire periphery of the plate 102. Accordingly, the external seal 118 can be attached to the first side 104 of the plate 102 where the object 110 extends beyond the periphery of the plate 102. In other words, the external seal 118 can be attached to the first side 104 of the plate 102 where necessary to provide an additional seal to the portions of the object 110 that are not supported by the internal seal 112.

The external seal 118 includes an external permeable layer 126. The external permeable layer 126 extends from the first side 104 of the plate 102 and beyond the outer periphery of the plate 102. In one example, the external permeable layer 126 is flexible and conforms to the shape of the object 110, when the end effector 100 in is use. Furthermore, the external permeable layer 126 is made of a low-stick material that reduces (e.g. eliminates) surface-to-surface adhesion between the object 110 and the external permeable layer 126 before and after the negative pressure has been applied by the vacuum 130, as described in more detail below. Additionally, the external permeable layer 126 is air permeable to allow air to be drawn, via a vacuum port 128 through the external permeable layer 126 in any of various directions, including laterally and vertically.

The external seal 118 also includes an external impermeable film 120. The external impermeable film 120 covers the external permeable layer 126 such that the external permeable layer 126 is partially interposed between the first side 104 of the plate 102 and the external impermeable film 120. The external impermeable film 120 has a surface area larger than the surface area of the external permeable layer 126 such that the external impermeable film 120 overlays an entirety of the external permeable layer 126 and extends beyond an entire periphery 125 of the external permeable layer 126. In this manner, the external permeable layer 126 is entirely covered by the external impermeable film 120. Furthermore, the external impermeable film 120 and external permeable layer 126 may be structurally united.

In one example, the external impermeable film 120 is flexible and conforms to the shape of the object 110, when the end effector 100 is in use. The external impermeable film 120 has a permeability low enough to prevent gasses from permeating through the external impermeable film 120, whether in thickness or plane. Accordingly, the permeability of the external impermeable film 120 is lower than the permeability of the external permeable layer 126. In one example, the external impermeable film 120 is made of a durable polymeric material, such as nylon, latex, or a thermoplastic elastomer, or a fabric. The external impermeable film 120 can be the same material or a different material than the internal impermeable film 116. Similarly, the external permeable layer 126 can be the same material or different material than the internal permeable layer 114.

The external impermeable film 120 is sealed to the first side 104 of the plate 102 around the entire periphery of the plate 102. Due to the low permeability of the external impermeable film 120, the seal between the external impermeable film 120 and the plate 102 is a hermetic or airtight seal. Such a seal is created between the external impermeable film 120 and the plate 102 in any of various ways. According to one example, the external impermeable film 120 is adhered to the plate 102 via a sealing mechanism, such as an adhesive or tape affixed to the plate 102 and to which the external impermeable film 120 is affixed. In other example, the seal between the external impermeable film 120 and the plate is facilitated by another type of seal, such as a gasket or O-ring, fastened or adhered to one or both the plate 102 and the external impermeable film 120.

The end effector 100 also includes at least one vacuum port 128. The vacuum port 128 extends through the plate 102 and is open to the internal permeable layer 114 and the first side 104 and second side 106 of the plate 102. Accordingly, air is passable into and out of the end effector 100 via the vacuum port 128. The vacuum port 128 is fluidically coupleable to a vacuum, such as a high flow vacuum, via a vacuum conduit 129 (or tube) (see, e.g., FIG. 6). In FIG. 1, the vacuum port 128 is located at a lower end of the plate 102. However, the vacuum port 128 may be located at any location in the plate 102. In one example, the vacuum port 128 is directly positioned over the internal permeable layer 114.

Referring to FIG. 1, the first side 104 of the plate 102 is shown. An external seal 118 extends from the first side 104 of the plate 102 and beyond each edge 119 of the plate 102. In other words, the external seal 118 extends beyond an outer periphery of the plate 102. The external seal 118 includes an external impermeable film 120 that is attached to the first side 104 of the plate 102 via a sealing mechanism, such as a tape. The external seal 118 also includes an external permeable layer 126 that is not visible from the first side 104 of the plate 102 as it is interposed between the first side 104 of the plate 102 and the external impermeable film 120. A vacuum port 128 is also located on the first side 104 of the plate and extends through the plate 102.

Referring to FIG. 2, the second side 106 of the plate 102 is shown. An internal seal 112 is attached to the second side 106 of the plate 102. The internal seal 112 includes an internal permeable layer 114. The internal permeable layer 114 has a surface area less than the surface area of the second side 106 of the plate 102. The internal seal 112 also includes an internal impermeable film 116. The internal impermeable film 116 is about the entire peripheral portion 115 of the internal permeable layer 114 and extends beyond the entire peripheral portion 115 of the internal permeable layer 114.

The external seal 118 is attached to the first side 104 of the plate 102 and extends beyond the edges 119 of plate 102. Accordingly, the external seal 118 extends beyond the edges 119 of the plate 102 and is partially visible from the second side 106 of the plate 102. The external impermeable film 120 has a surface area larger than that of the external permeable layer 126. Accordingly, the external impermeable film 120 overlays an entirety of the external permeable layer 126 and extends beyond an entire periphery 125 of the external permeable layer 126.

Referring to FIG. 3, a cross-sectional side view of one implementation of the end effector 100 of FIG. 1, along line 3-3 of FIG. 1, is shown. The end effector 100 includes an internal seal 112 and an external seal 118. The internal seal 112 is attached to the second side 106 of the plate 102 and includes an internal permeable layer 114 and an internal impermeable film 116 about and extending beyond the entire peripheral portion 115 of the internal permeable layer 114. The external seal 118 is attached to the first side 104 of the plate 102 and includes an external permeable layer 126 and an external impermeable film 120 covering and extending beyond the entire periphery 125 of the external permeably layer 126. The external permeable layer 126 extends from the first side 104 of the plate 102 and is interposed between the first side 104 and the external impermeable film 120. In one example, the external seal 118 and the internal seal 112 are utilized to pick up an object 110 that requires a secure hold, such as a heavier object 110. In other examples, the internal seal 112 holds the inner permeable layer 114 in place and prevents it from shifting and the external seal 118 seals the object 110 to the end effector 100.

Figure 4:
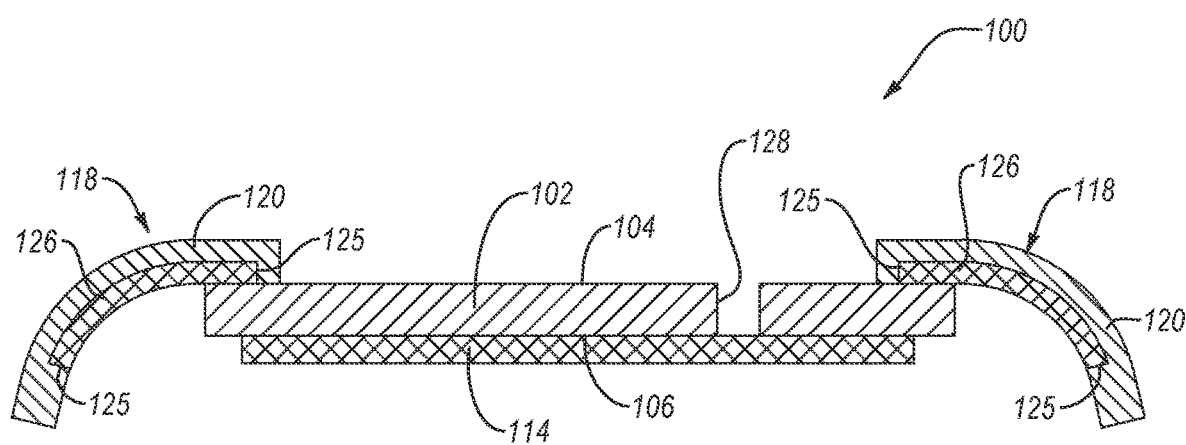
FIG. 4 is a schematic cross-sectional side elevation view of the end effector of FIG. 1, taken along line 3-3 of FIG. 1, according to one or more examples of the present disclosure.

In FIG. 4, a cross-sectional side view of another implemenation of the end effector 100 of FIG. 1, along line 3-3, is shown. The end effector 100 includes an external seal 118 like the external seal 118 in FIG. 3 but does not include an internal seal 112 with both an internal impermeable film 116 and an internal permeable layer 114. Instead, the internal permeable layer 114 is attached to the second side 106 of the plate 102, without the internal impermeable film 116. An end effector 100 without an internal seal 112 may be utilized when picking up an object 110 which would benefit from having a suction force applied evenly over the entire area of the object 110, such as an object 110 that is more susceptible to distortion or indentations from an internal seal 112. In some examples, the internal permeable layer 114 is affixed to the second side 106 of the plate 102 by an adhesive or other attachment means at discrete locations that have a negligible effect on the airflow through the internal permeable layer 114.

When the end effector 100 is in use, the internal permeable layer 114 is air permeable to allow air to be drawn, via a vacuum port 128, evenly through the internal permeable layer 114. Accordingly, the internal permeable layer 114 provides support to the entire area of the object 110 that contacts with the internal permeable layer 114, when the end effector 100 is in use. The external seal 118 is the sole seal used to create a hermetic or airtight seal. In other words, the external seal 118 is used to create a pressure differential that results in a suction force over the entire area of the object 110 that comes into contact with the internal permeable layer 114 and the external permeable layer 126. In one example, the internal permeable layer 114 has a surface area equal to the surface area of the second side 106 of the plate 102. In another example, the internal permeable layer 114 has a surface area less than the surface area of the second side 106 of the plate 102. In yet another example, the internal permeable layer 114 has a surface area greater than the surface area of the second side 106 of the plate 102, allowing the internal permeable layer 114 to transfer air flow more readily to the external permeable layer 126. Accordingly, the internal permeable layer 114 may be noncontiguous with the second side 106 of the plate 102.

Figure 5:
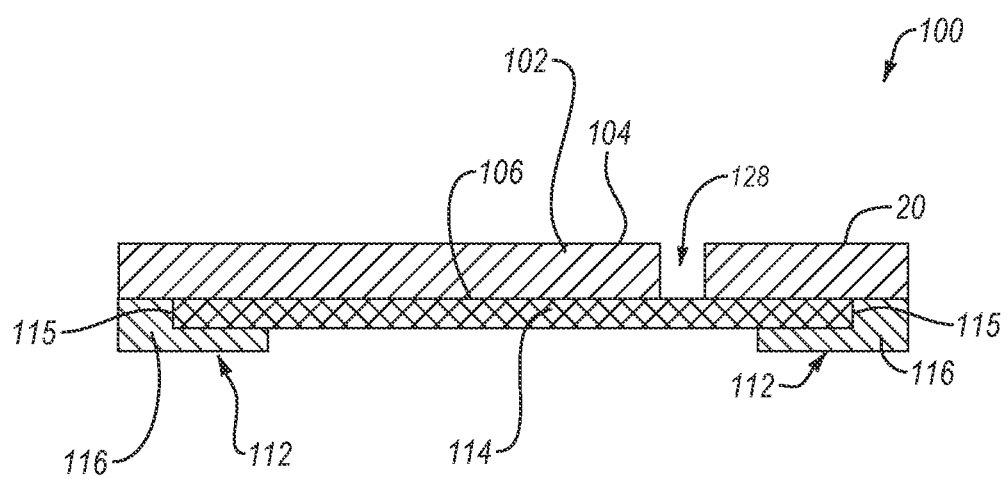
FIG. 5 is a schematic cross-sectional side elevation view of an end effector with an internal seal, according to one or more examples of the present disclosure.

Additionally, in FIG. 5, a cross-sectional side view of yet another implementation of the end effector 100 is shown. The end effector includes an internal seal 112 but does not include an external seal 118. The internal seal 112 has an internal impermeable film 116 and an internal permeable layer 114. In one example, an end effector 100 without an external seal 118 may be utilized when picking up an object 110 with a surface area less than the surface area of the second side 106 of the plate 102. In other words, the object 110 is smaller than the end effector 100 and therefore would not benefit from the addition of an external seal 118. In other examples, the end effector without an external seal 118 may be utilized when picking up an object 110 with a surface area that is equal to the surface area of the second side 106 of the plate 102.

Figure 6:
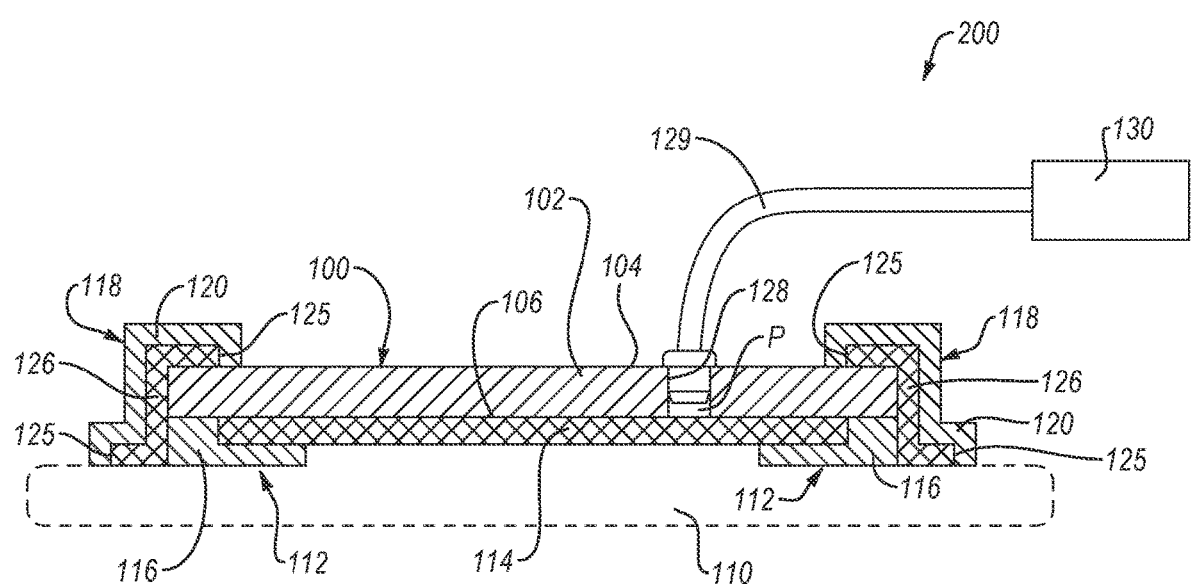
FIG. 6 is a schematic cross-sectional side elevation view of a system for picking up an object, the system including an end effector with an external seal and an internal seal interfacing with an object, according to one or more examples of the present disclosure.

As shown in FIG. 6, a system 200 includes a vacuum 130 fluidically coupleable to the vacuum port 128. The vacuum 130 can be any system, device, or component operable to selectively apply negative pressure (e.g. suction) to the end effector 100 in order to pick up and place, then secure an object 110 to a rigid tool. The vacuum 130 draws air from between the internal permeable layer 114 and the external permeable layer 126 and the object 110. Accordingly, the air travels through the vacuum 130 and is ejected into the surrounding environment. In one example, the vacuum 130 is a high flow volume vacuum, which is capable of drawing a large amount of air through the vacuum 130, but not necessarily at a high pressure. In this manner, the vacuum 130 is selectively operable to adjust the pressure in the area between the end effector 100 and the object 110. For example, the vacuum 130 is selectively operable to reduce the pressure below atmospheric pressure. One or more vacuums 130 may be utilized to maintain the necessary negative pressure. Additionally, the rate at which the vacuum 130 operates may vary as a function of the size of the object 110.

The system 200 is used to pick up an object 110. In one example, the object 110 is a composite material having a single ply or multi-ply stack and a thickness substantially less than a length and width. Each ply of the object 110 includes fibrous materials, such as carbon, glass, and the like and may be pre-preg (e.g., fibrous material pre-impregnated with a resin). The composite material may be multi-directional or uni-directional. In other examples, the object 110 is an adhesive, coating, film, dry fiber, or other object. Generally, the object 110 is an impermeable object. However, in the case of an object 110 being permeable, such as a dry fiber, an impermeable material can be applied to the supporting surface before the permeable object is built up onto the supporting surface. Accordingly, when the end effector 100 is used to pick up the object 110, the object 110 will be held in negative pressure between the impermeable material and the end effector 100.

The material buildup of the object 110 collectively defines a shape of the object 110, which can be various shapes. In one example, the object 110 is substantially flat or 2-dimensional with a thickness smaller than a width or length of the object 110. According to other examples, the object 110 is substantially non-planar or 3-dimensional. In some examples, the shape of the object 110, before being picked up by the end effector 100, correlates with the shape of the second side 106 of the plate 102. In other examples, the shape of the object 110 does not correlate with the shape of the second side 106 of the plate 102. Accordingly, a single end effector 100 could be used to pick up objects 110 of various shapes.

The amount of holding force applied by the end effector 100 to the object 110 is based upon the difference between a volume of air drawn by the vacuum 130 and the volume of air that leaks through the external impermeable film 120. Accordingly, the volume of air drawn by the vacuum 130 should be equal to or larger than the volume of air that leaks through the external impermeable film 120. In other words, negative pressure is maintained by evacuating an equal or greater amount of air than is lost via leaks between the external impermeable film 120 and the object 110. Since the object 110 is not affixed to end effector 100 via sealant, glue, fasteners, etc, minor air leaks may exist because negative pressure is the primary (e.g., sole) force that secures the object 110 to the end effector 100.

The vacuum 130 is operated to achieve a pressure P, lower than atmospheric pressure, within the area between the end effector 100 and the object 110. In one example, the pressure P is approximately zero pounds per square inch (psi). The pressure differential between atmospheric pressure, external to the system, and the pressure P causes air between the end effector 100 and the object 110 to evacuate and flow to the vacuum port 128. Due to the permeability of the internal permeable layer 114 and the external permeable layer 126, the internal permeable layer 114 and external permeable layer 126 provide a low-resistance flow path in which air can more efficiently flow to and through the vacuum port 128.

In some examples, the internal permeable layer 114 and the external permeable layer 126 are both made from a material that is flexible as negative pressure is applied to the system, drawing snugly over the object 110 while still enabling air to be drawn freely across object 110. Accordingly, the internal permeable layer 114 and the external permeable layer 126 enables the drawing of air across the object 110 without causing markoff or leaving some type of undesirable indentation upon the object 110. Additionally, the internal permeable layer 114 and the external permeable layer 126 are formed from a high-flow material. In other words, the internal permeable layer 114 and the external permeable layer 126 do not substantially restrict the rate of which the vacuum 130 draws air. The resistance of the internal permeable layer 114 and the external permeable layer 126 to airflow therefore has a negligible impact on the flow rate of the vacuum 130.

In some examples, the internal permeable layer 114 and the external permeable layer 126 include an open-celled material, such as a foam or mesh that is air permeable. The internal permeable layer 114 and external permeable layer 126 may be both laterally (e.g., across a length or width) and vertically (e.g., across a thickness) air permeable or may have air flow that is irregular or non-linear. The open-celled material is sufficiently rigid to ensure that it does not collapse under the object 110 and sufficiently open so that airflow is not inhibited.

Figure 7:
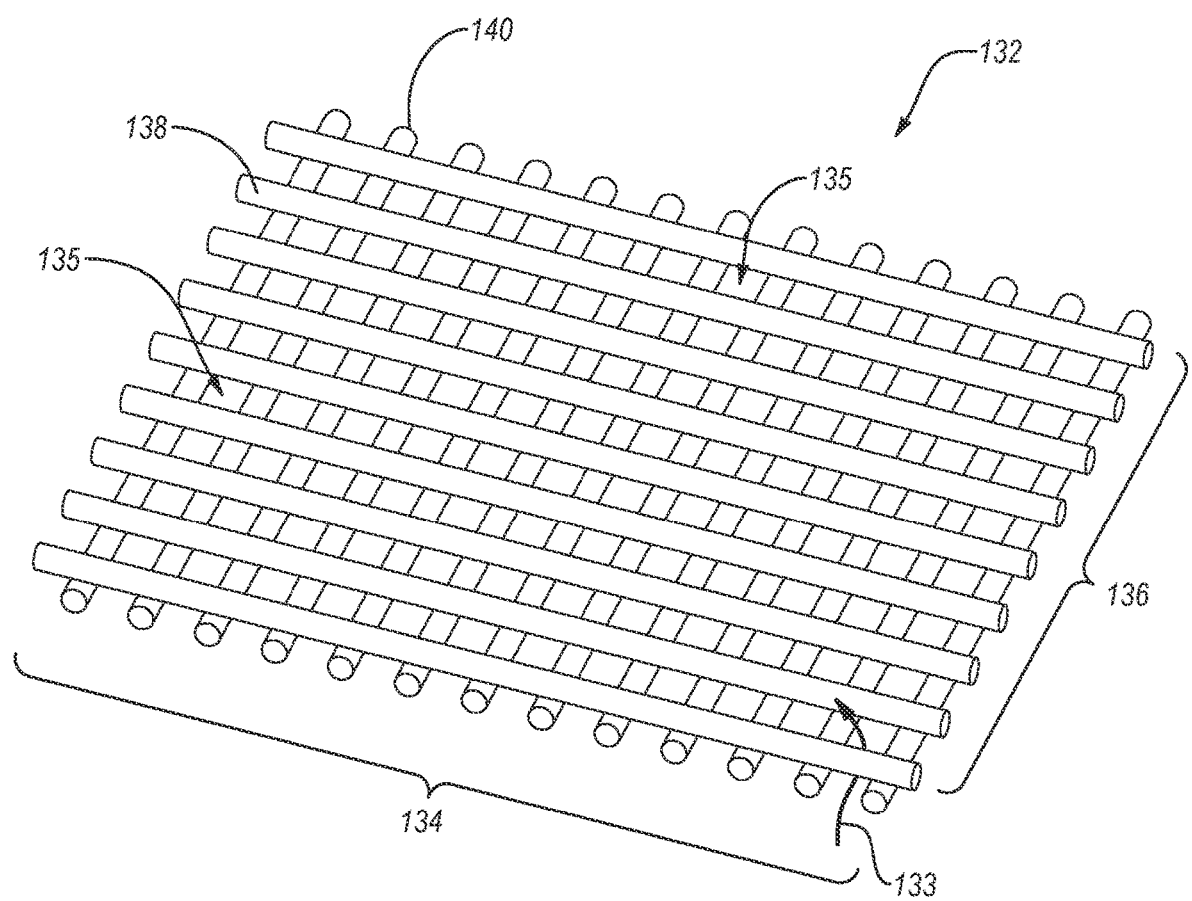
FIG. 7 is a schematic illustration of a permeable layer of an end effector, according to one or more examples of the present disclosure.

For example, the internal permeable layer 114 and external permeable layer 126 may be a biplanar mesh 132 that facilities airflow. An example of a biplanar mesh 132 is shown in FIG. 7. The biplanar mesh 132 is both vertically and laterally air-permeable. Accordingly, air 133 may flow freely through gaps 135 in the biplanar mesh 132, as well as across gaps 135 in the biplanar mesh 132. A first layer 134 of the biplanar mesh includes structural elements 140 that are arranged parallel with each other. A second layer 136 of the biplanar mesh include structural elements 138 that are arranged parallel with each other. The first layer 134 is in a first direction and the second layer 136 is in a second directions. As shown, the first layer 134 and the second layer 136 are perpendicular to each other, however, the first direction and second direction could be in any directions that cross over each other. Layer 134 enables air to flow horizontally in a first direction and layer 136 enables air to flow horizontally in a second direction. Additionally, both layers allow air 133 to flow freely vertically. Accordingly, if a negative pressure is applied to one portion of the biplanar mesh 132, the negative pressure may draw air evenly across the entirety of the biplanar mesh 132.

The biplanar mesh 132 enables free airflow, and does not interfere with the drawing of air by the vacuum 130. In other words, the biplanar mesh 132 does not limit the rate of airflow to the vacuum 130. The biplanar mesh 132 may be formed from polyethylene, polypropylene, nylon, etc. The biplanar mesh 132 is formed from a material that is contact approved to contact the object 110 (e.g., an un-cured composite material) without transferring any residue from the material or chemically interacting with the object 110. Additionally, the material does not cause markoff or leave some type of undesirable indentation upon the object 110. Accordingly, in certain examples, the biplanar mesh 132 interfaces with the object 110 through a negative pressure and does not leave any marks or indentations on the object 110.

Figure 8A:
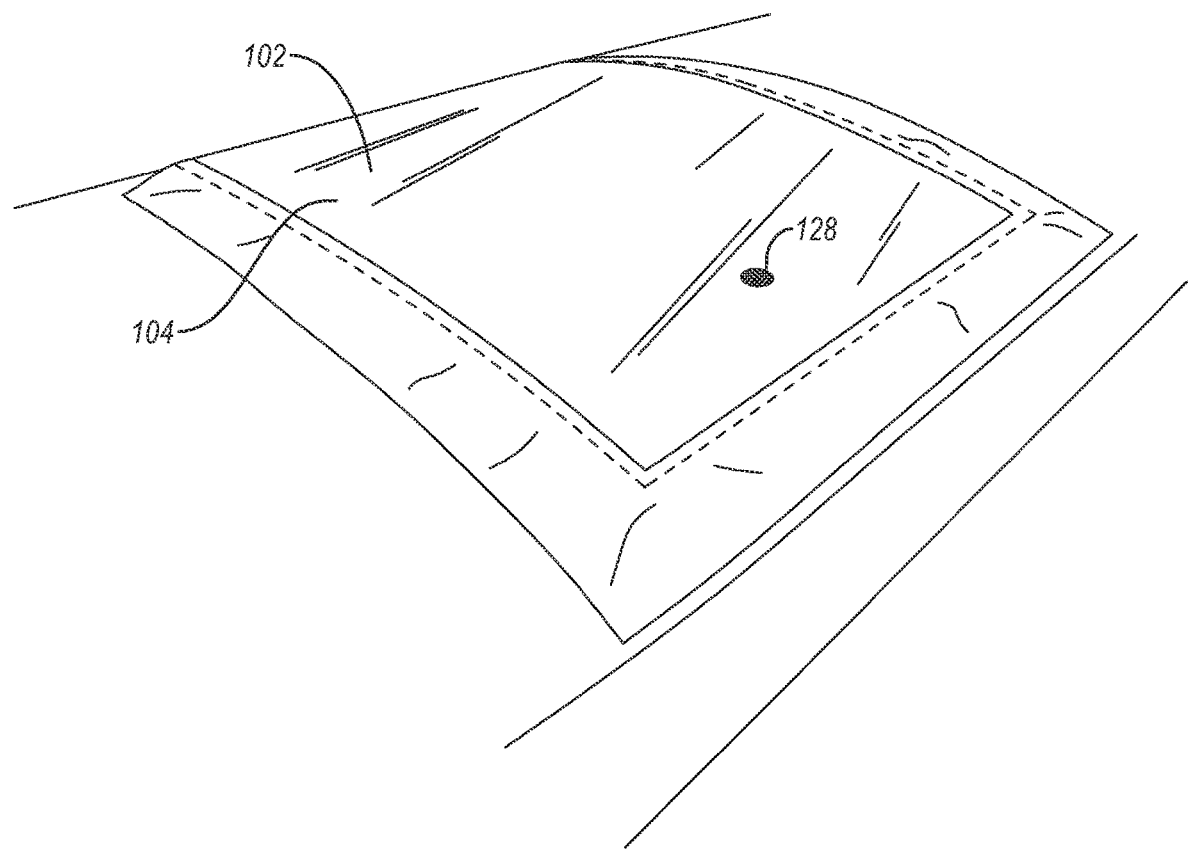
FIG. 8A is a schematic perspective view of an end effector, according to one or more examples of the present disclosure.
Figure 8B:
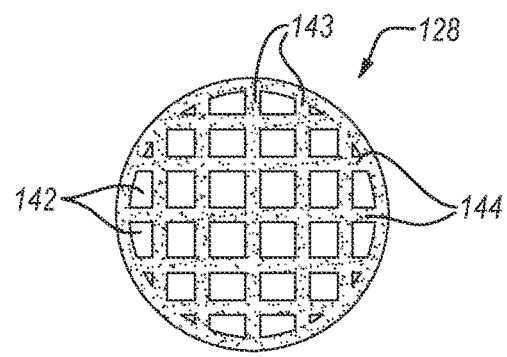
FIG. 8B is a schematic top plan view of a vacuum port, according to one or more examples of the present disclosure.

Referring to FIG. 8A, the first side 104 of the plate 102 is shown. The plate 102 has a vacuum port 128 that extends through the plate 102 and is open to the first side 104 and the second side 106 of the plate 102. In one example, the vacuum port 128 is an open aperture. In other examples, as shown in FIG. 8B, the vacuum port 128 includes open slots 142 that extend from the first side 104 to the second side 106 of the plate 102. In one example, the open slots 142 may be arranged in a grid pattern, with parallel walls 143 of plate material extending in a first direction and parallel walls 144 of plate material extending in a second direction. The walls 143 and the walls 144 may be perpendicular to each other. In other examples, the open slots are lengthwise openings, formed between parallel walls of plate material in a first direction.

When the end effector 100 is in use and the vacuum 130 is drawing air through the vacuum port 128, it is necessary for the vacuum 130 to efficiently pull enough vacuum to avoid choking (e.g., limiting) the flow of air. However, the vacuum 130 cannot be too strong and draw air too intensively over the object 110 which could cause distortions or indentations to the object 110. Accordingly, open slots 142 in the vacuum port 128 can help maintain adequate flow of air through the vacuum port 128 without limiting or exceeding the negative pressure necessary to support the object 110.

Figure 9:
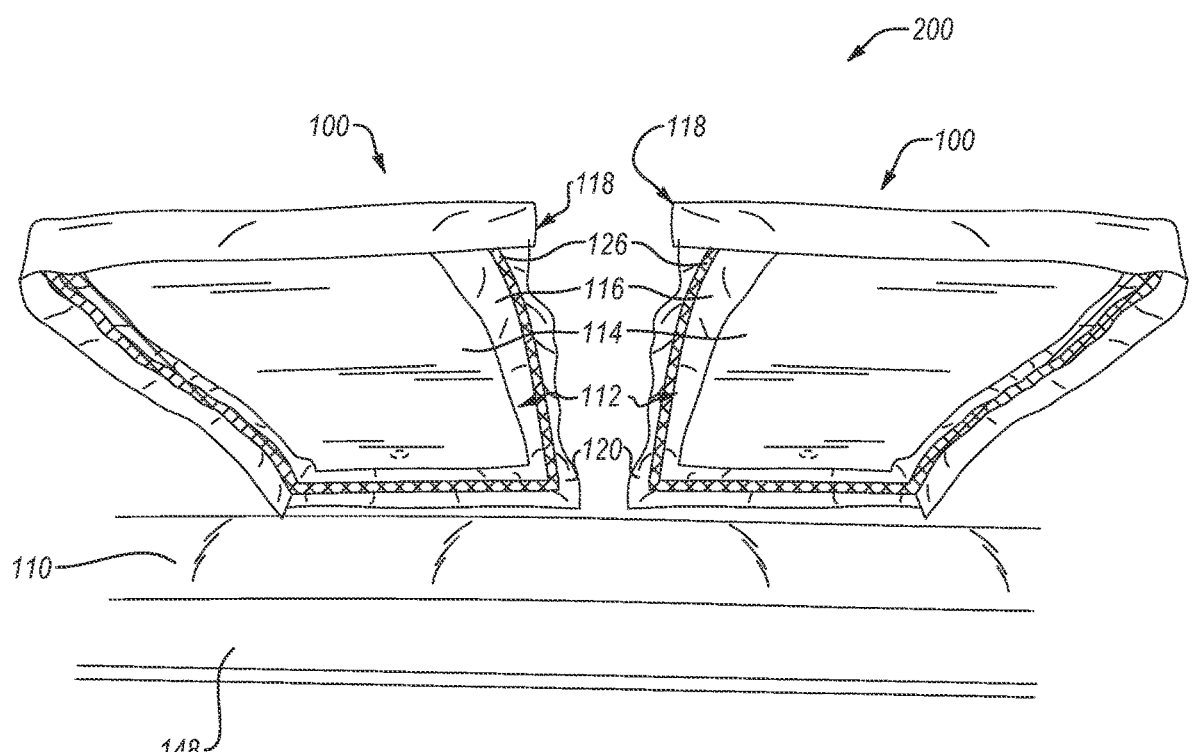
FIG. 9 is a schematic perspective view of a system for picking up an object, where the system includes multiple end effectors, according to one or more examples of the present disclosure.

As shown in FIG. 9, an end effector 100 may be used to pick up an object 110. In one example, a single end effector 100 may be used to pick up an object 110. In other examples, multiple end effectors 100 may be used to pick up an object 110 (see, e.g. FIG. 9). In some cases when the object 110 to be picked up is large it may not be feasible or economically beneficial to use a single end effector 100. Accordingly, multiple smaller end effectors 100 can be utilized to pick up the object 110. The multiple end effector 100 are used synchronously to pick up the object 110. The object 110, which may be an uncured multilayer laminate, is on a supporting surface 148, such as a lamination mandrel or supporting feeder line. The supporting surface 148 is a rigid surface where the object 110 is placed to be picked up by the end effector 100. The object 110 may be placed on the supporting surface 148 by any means, such as an automatic fiber placement machine, contour tape layer machine or manually. As shown, the end effectors each have an external seal 118 and an internal seal 112. However, the end effectors could have any configuration described above, including having only an external seal 118 or only an internal seal 112.

Figure 10:
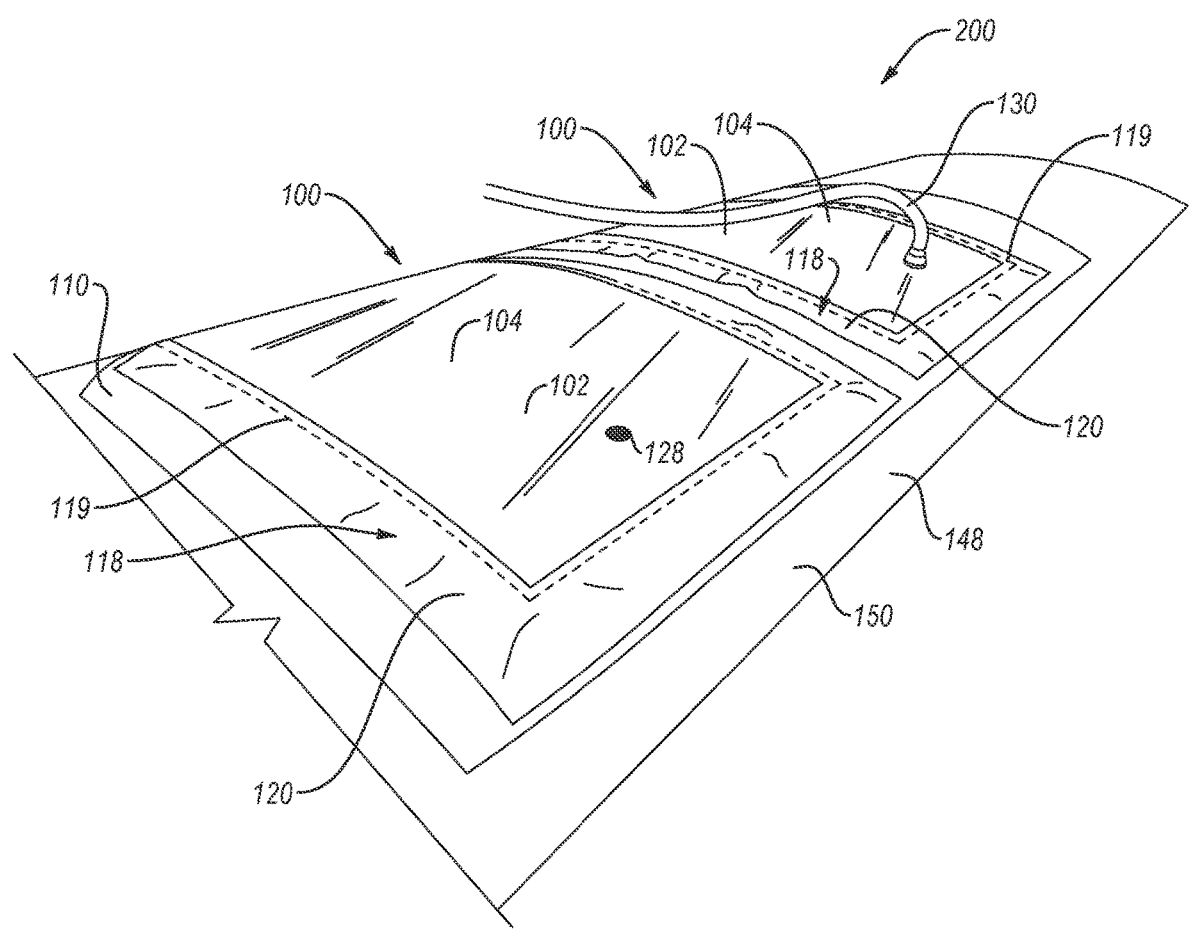
FIG. 10 is a schematic perspective view of a system for picking up an object, where the system includes multiple end effectors shown interfacing with an object on a supporting surface, according to one or more examples of the present disclosure.

Referring to FIG. 10, the multiple end effectors 100 are placed over the object 110. As shown, one of the end effectors 100 has the vacuum port 128 visible and is not connected to a vacuum, while the second end effector is connected to a vacuum 130. In this example, both of the end effectors 100 are connectable to a vacuum 130 which is configured to apply a negative pressure and seal the object 110 to the end effectors 100 at each external seal 118. The end effectors 100 can be lifted synchronously by use of mechanical means, such as a strongback connected to the end effectors 100, not shown.

In some examples, in order for sufficient negative pressure to secure the object 110 to the end effectors 100, the periphery of each of the external seals 118 is approximately equal to or less than the periphery of the object 110. Accordingly, each of the external seals 118 is within the area of the object 110. This ensures that the external seal 118 is drawn securely by negative pressure directly on the object 110 without losing too much air via air leaks between the external impermeable film 120 and the object 110 due to an incomplete seal. In one example, if the object 110 is sufficiently rigid, that is the object 110 can maintain its structure when lifted without support, the object 110 may extend beyond the periphery of the external seal 118. However, in other examples, if the object 110 is pliable, that is the object is prone to droop or peel without support, the periphery of the external seal 118 is approximately at the periphery of the object 110. In this manner, the object 110 is fully supported at the periphery of the object 110 by the external seal 118.

Figure 11:
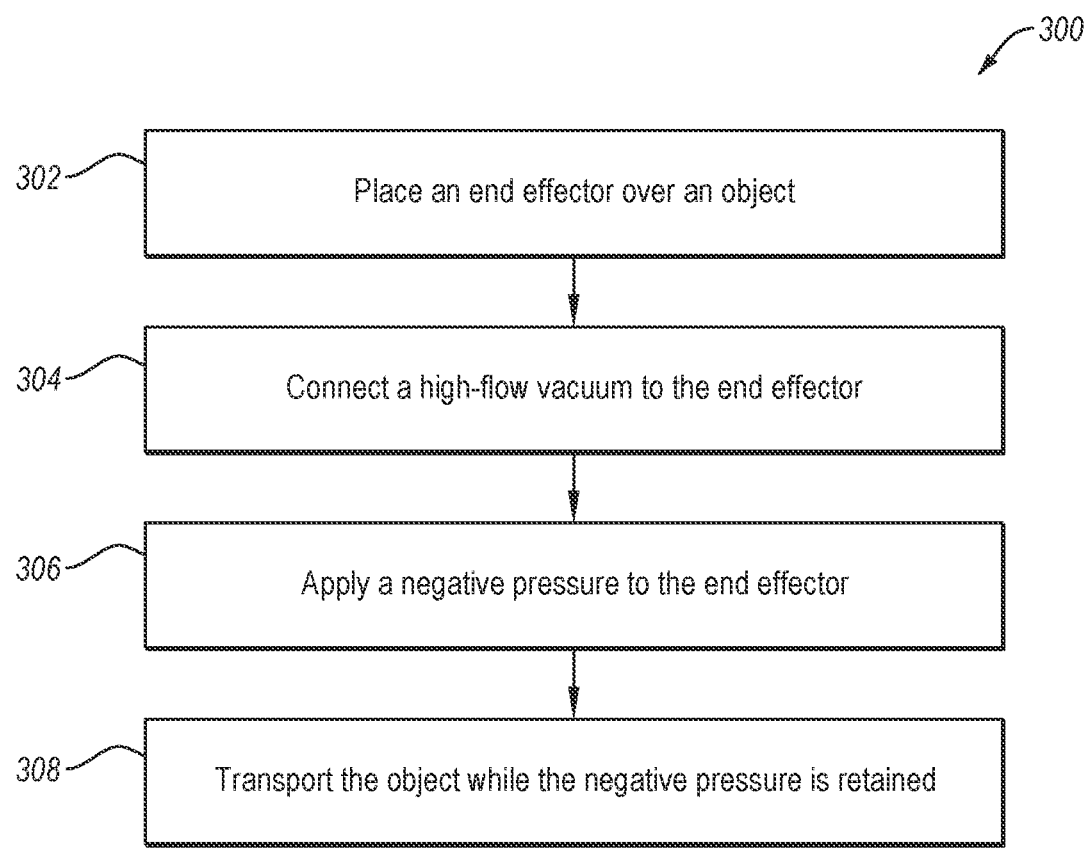
FIG. 11 is a schematic flow diagram of a method for picking up an object, according to one or more examples of the present disclosure.

Referring to FIG. 11, according to one example, a method 300 for picking up and placing an object 110 includes (block 302) placing at least one end effector 100 over an object 110. The end effector 100 includes a sealing member, such as an external seal 118, an internal seal 112, or both an external seal 118 and an internal seal 112. In some examples, an external seal 118 extends beyond an outer periphery of the end effector 100. The external seal 118 includes an external permeable layer 126 and an external impermeable film 120 covering the external permeable layer 126 and extending beyond an entire periphery of the external permeable layer 126. The method 300 also includes (block 304) connecting a high-flow vacuum 130 to a vacuum port 128 in the end effector 100. The method 300 further includes (block 306) applying a negative pressure via the high-flow vacuum 130 to seal the object 110 to the end effector 100 at the external seal 118. The method 300 additionally includes (block 308) transporting the object 110 while the negative pressure is retained.

In some implementations, the system 200 is used to manually and/or automatically perform the steps of the method 300, as described above. The method 300 can be used to pick up an object 110 from a first location and transport the object 110 back to the first location or transport the object 110 to a second location. In one example, the object 110 is picked up from a supporting surface and transported back to the supporting surface and held in place to the end effector 100 during transportation by negative pressure. In another example, the object 110 is picked up from a supporting surface and transported to a rigid tool 150 to continue the manufacturing process on the object 110 at the rigid tool. Accordingly, the method 300 can further include locating the object 110 on a rigid tool 150. Generally, the rigid tool 150 is a critical path cure tool. The method also includes halting the negative pressure and removing the end effector 100 from the object 110. Accordingly, the negative pressure is halted to enable removal of the end effector 100 from the object 110. After the end effector 100 is removed from the object 110, the object 110 is absent of indentations, distortions or other deformations from the end effector 100.

In some examples, the object 110 to be picked up is an impermeable object which can be held by the negative pressure between the impermeable object and the end effector 110. In other examples, the object 110 to be picked up is a permeable object, such as a dry fiber. Since the end effector 100 cannot maintain a negative pressure between a permeable object and the end effector 100, an impermeable material is utilized. The impermeable material is applied to the supporting surface 148 before the permeable object is laid up or put on the supporting surface 148. The impermeable material has a surface area that is larger than the surface area of the permeable object. Therefore, when the end effector 100 is in use, the permeable object is interposed between the end effector 100 and the impermeable material. In other words, the end effector 100 is used to pick up the permeable object held by the negative pressure between the impermeable material and the end effector 100.

Additionally, the method 300 can further include shaping the object 110 while the object 110 is held under negative pressure by the end effector 100. In one example, the object 110 can be shaped by altering the shape of the end effector 100 after the object 110 has been lifted from a supporting surface 148 and before the object 110 is placed on a rigid tool 150. In other words, the object 110 can be shaped while the object 110 is being transported and is not supported on a rigid surface. In another examples, the object 110 can be shaped after the object is located on a rigid tool 150. Accordingly, the object 110 is shaped between the rigid tool 150 and the end effector 100 while the object 110 is held under negative pressure by the end effector 100.

Since the internal permeable layer 114 and the external permeable layer 126 support the object 110 across the entirety of the object 110, due to the differential of pressure outside the end effector 100 compared to the pressure inside the end effector 100, such shaping techniques ensure that the object 110 is not deformed in an unexpected manner while the object 110 is being shaped.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an,"

and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An end effector comprising:
a plate comprising a first side and a second side, the second side being opposite the first side and configured to interface with an object;
an internal seal attached directly to the second side of the plate, the internal seal comprising:
an internal permeable layer; and
an internal impermeable film about and extending beyond an entire periphery of the internal permeable layer and wrapping underneath a portion of the internal permeable layer such that, in a direction parallel to a thickness of the internal permeable layer, the entire periphery of the internal permeable layer is interposed between the second side of the plate and the internal impermeable film; and
at least one vacuum port extending through the plate and open to the internal permeable layer.

2. The end effector of claim 1, further comprising:
an external seal attached to the first side of the plate, the external seal comprising:
an external permeable layer extending from the first side of the plate beyond an outer periphery of the plate; and
an external impermeable film covering the external permeable layer such that the external permeable layer is interposed between the first side of the plate and the external impermeable film, the external impermeable film extending beyond an entire periphery of the external permeable layer and extending from the first side of the plate beyond the outer periphery of the plate.

3. The end effector of claim 2, wherein the internal permeable layer and the external permeable layer each comprises an open-celled material.

4. The end effector of claim 3, wherein the open-celled material comprises a bi-planar mesh.

5. The end effector of claim 1, wherein the internal seal is noncontiguous with the second side of the plate.

6. The end effector of claim 1, wherein the at least one vacuum port comprises slots arranged in a grid pattern.

7. The end effector of claim 1, wherein the plate is rigid.

8. The end effector of claim 1, wherein the plate is flexible.

9. The end effector of claim 1, wherein the internal impermeable film overlaps the internal permeable layer between 1 inch and 4 inches.

10. An end effector comprising:
a plate comprising a first side and a second side, the second side being opposite the first side and configured to interface with an object;

an internal permeable layer attached to the second side of the plate;

an external seal attached to the first side of the plate; the external seal comprising:
- an external permeable layer extending from the first side of the plate beyond an outer periphery of the plate; and
- an external impermeable film covering the external permeable layer such that the external permeable layer is interposed between the first side of the plate and the external impermeable film, the external impermeable film extending beyond an entire periphery of the external permeable layer and extending from the first side of the plate beyond the outer periphery of the plate; and at least one vacuum port extending through the plate and open to the internal permeable layer.

11. The end effector of claim 10, wherein the internal permeable layer has a surface area equal to a surface area of the second side of the plate.

12. The end effector of claim 10, wherein the internal permeable layer has a surface area greater than a surface area of the second side of the plate.

13. The end effector of claim 12, further comprises:
an internal impermeable film about and extending beyond an entire periphery of the internal permeable layer such that the entire periphery of the internal permeable layer is interposed between the second side of the plate and the internal impermeable film.

14. A method for picking up and placing an object, the method comprising:
placing at least one end effector over an object, the at least one end effector comprising an external seal extending beyond an outer periphery of the at least one end effector, the external seal comprising an external permeable layer and an external impermeable film covering the external permeable layer and extending beyond an entire periphery of the external permeable layer;

connecting a high-flow vacuum to a vacuum port in the at least one end effector;

applying a negative pressure via the high-flow vacuum to seal the object to the at least one end effector at the external seal;

transporting the object while the negative pressure is retained;

locating the object on a rigid tool;

halting the negative pressure when the object is on the rigid tool; and removing the at least one end effector from the object.

15. The method of claim 14, wherein placing the at least one end effector over the object comprises placing at least one end effector comprising an internal seal over the object, the internal seal interfacing with the object and comprising an internal permeable layer and an internal impermeable film about and extending beyond an entire periphery of the internal permeable layer; and
applying the negative pressure comprises applying a negative pressure to seal the object to the at least one end effector at the internal seal and the external seal.

16. The method of claim 14, wherein:
placing the at least one end effector over the object comprises placing multiple end effectors over an object;
connecting the high-flow vacuum comprises connecting the high-flow vacuum to a vacuum port in each end effector;
applying the negative pressure via the high-flow vacuum comprises synchronously applying the negative pressure via the high-flow vacuum to seal the object to the multiple end effectors at the external seal in each end effector; and
transporting the object comprising transporting the object by synchronously operating the multiple end effectors to transport the object.

17. The method of claim 14, further comprising shaping the object when the object is held under the negative pressure by the end effector by altering a shape of the end effector.

18. The method of claim 14, further comprising:
shaping the object between the rigid tool and the end effector, while the object is held under negative pressure by the end effector, by altering the shape of the end effector.

19. The method of claim 14, wherein:
the object comprises an uncured fiber reinforced laminate; and
placing the at least one end effector over the object comprises placing the at least one end effector over the uncured fiber reinforced laminate.

20. The method of claim 14, wherein:
the object comprises a permeable object and an impermeable material underneath the entirety of the permeable object and extending beyond the periphery of the permeable object; and
placing the at least one end effector over the object comprises placing the at least one end effector over the permeable object and the impermeable material such that the permeable object is entirely interposed between the end effector and the impermeable material.

* * * * *